(12) United States Patent
Lucioni

(10) Patent No.: US 7,092,382 B2
(45) Date of Patent: Aug. 15, 2006

(54) METHOD FOR IMPROVING THE QUALITY OF AN AUDIO TRANSMISSION VIA A PACKET-ORIENTED COMMUNICATION NETWORK AND COMMUNICATION SYSTEM FOR IMPLEMENTING THE METHOD

(75) Inventor: Gonzalo Lucioni, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 887 days.

(21) Appl. No.: 09/780,619

(22) Filed: Feb. 12, 2001

(65) Prior Publication Data

US 2004/0213203 A1 Oct. 28, 2004

(30) Foreign Application Priority Data

Nov. 2, 2000 (DE) ................. 100 06 245

(51) Int. Cl.
- *H04L 12/66* (2006.01)
- *H04J 3/16* (2006.01)
- *G10L 19/00* (2006.01)
- *G10L 21/00* (2006.01)

(52) U.S. Cl. ............ 370/352; 370/465; 704/500; 704/503

(58) Field of Classification Search ........ 370/352–356, 370/465; 704/500, 503
See application file for complete search history.

(56) References Cited

U.S. PATENT DOCUMENTS

| 4,100,377 | A | * | 7/1978 | Flanagan ............. 370/435 |
|---|---|---|---|---|
| 5,018,136 | A | * | 5/1991 | Gollub ................ 370/471 |
| 5,101,369 | A | * | 3/1992 | Torii et al. ............ 708/314 |
| 5,479,564 | A | * | 12/1995 | Vogten et al. .......... 704/267 |
| 5,649,050 | A | * | 7/1997 | Hardwick et al. ....... 704/203 |
| 6,000,834 | A | * | 12/1999 | Duan ................. 708/313 |
| 6,519,567 | B1 | * | 2/2003 | Fujii ................. 704/503 |
| 6,665,751 | B1 | * | 12/2003 | Chen et al. ............ 710/52 |
| 6,678,243 | B1 | * | 1/2004 | Sartain et al. .......... 370/229 |
| 6,741,649 | B1 | * | 5/2004 | Ishiyama et al. ..... 375/240.12 |
| 6,804,244 | B1 | * | 10/2004 | Anandakumar et al. ........... 370/395.21 |

FOREIGN PATENT DOCUMENTS

| DE | 198 04 581 | 8/1999 |
|---|---|---|
| EP | 0 797 883 | 4/1999 |

OTHER PUBLICATIONS

Grill et al. "Information Technology—Very Low Bitrate Audio-Visual Coding" ISO/IEC 14496-3 Subpart 1:1998.

* cited by examiner

*Primary Examiner*—Huy D. Vu
*Assistant Examiner*—Nittaya Juntima
(74) *Attorney, Agent, or Firm*—Morrison & Foerster LLP

(57) ABSTRACT

The invention permits the improvement of the quality of an audio transmission in which audio data including samples of an audio signal are asynchronously transmitted in data packets via a packet-oriented communication network, such as a LAN. According to the invention, the audio data to be transmitted and/or already transmitted are digitally converted such that their sampling rate is altered and/or the duration of an audio signal represented by the audio data is modified while largely retaining its pitch. The conversion is performed based on a transmission situation currently detected, in such a manner that a quality of service of the audio transmission is optimized.

11 Claims, 2 Drawing Sheets

METHOD FOR IMPROVING THE QUALITY OF AN AUDIO TRANSMISSION VIA A PACKET-ORIENTED COMMUNICATION NETWORK AND COMMUNICATION SYSTEM FOR IMPLEMENTING THE METHOD

TECHNICAL FIELD OF THE INVENTION

The invention relates to a method for improving the quality of an audio transmission in which audio data containing samples of an audio signal are transmitted asynchronously in data packets via a packet-oriented communication network, and in particular to a communication network, without guaranteed quality of service. The invention also relates to a communication system for implementing the method according to the invention.

BACKGROUND OF THE INVENTION

Due to the global increase in transmission capacities of data-packet-oriented communication networks, such as the Internet or local area networks (LANs), it has become increasingly popular to use such data networks increasingly for voice communication. The problem in this case is that many widely used types of packet-oriented communication networks cannot guarantee a quality of service which is required for real-time voice transmissions.

To improve the real-time characteristics of voice transmissions via packet-oriented communication networks without guaranteed quality of service, various measures are known, for example from ITU-T Recommendation H.225.0 dated February 1998. Thus, for example, in section 8.5 of this document it is proposed, in conjunction with the retention of a predetermined quality of service, to lower the rate of transmission of the data packets in response to an increasing loss of data packets containing audio data. This measure is intended to reduce the transmission load and thus the packet loss rate. However, this control mechanism is severely restricted due to the real-time requirements of a voice transmission. In addition, the application of this measure is restricted to the transmitter end.

SUMMARY OF THE INVENTION

In one embodiment of the invention, there is a method for improving the quality of an audio transmission in which audio data including samples of an audio signal are asynchronously transmitted in data packets from a transmitting communication system via a packet-oriented communication network to a receiving communication system. An information item relating to the transmission of data packets is detected, wherein the audio data are converted such that their sampling rate is altered by means of digital filtering, the sampling rate being altered based on the detected information item, in such a manner that due to the altered sampling rate, a quality of service of the audio transmission is optimized with regard to a current transmission situation indicated by the detected information item.

In another embodiment of the invention, there is a method for improving the quality of an audio transmission in which audio data including samples of an audio signal are asynchronously transmitted in data packets from a transmitting communication system via a packet-oriented communication network to a receiving communication system. An information item relating to the transmission of data packets is detected, wherein the audio data are digitally converted such that the duration of an audio signal represented by the audio data is modified while retaining a pitch of the audio signal, the duration being modified based on the detected information item, in such a manner that due to the modified duration, a quality of service of the audio transmission is optimized with regard to a current transmission situation indicated by the detected information item.

In one aspect of the invention, the audio data to be transmitted are converted by the transmitting communication system and a conversion message about the conversion is transmitted from the transmitting communication system to the receiving communication system.

In another aspect of the invention, the transmitted audio data are reconverted by the receiving communication system, the change in the audio data taking place in the reconversion being determined by means of the conversion message transmitted.

In still another aspect of the invention, the transmission of the data packets is monitored by the receiving communication system and an information item relating to this transmission is transmitted to the transmitting communication system and the audio data are converted by the transmitting communication system based on the information item transmitted.

In yet another aspect of the invention, the information item transmitted specifies a data packet loss rate and, if the data packet loss rate rises, the audio data are converted by the transmitting communication system in such a manner that the audio data rate is reduced.

In still another aspect of the invention, a detected incorrect adaptation of the data rate of the received audio data is at least partially compensated by the receiving communication system by means of a conversion of the received audio data.

In yet another aspect of the invention, the received audio data are converted after having been read out of an input buffer provided for compensating data packet delay variations, in which the read-out speed of the input buffer is controlled by a change in the audio data rate due to the conversion.

In another aspect of the invention, the audio data included in the data packet preceding and/or following the lost data packet are converted by the receiving communication system such that the duration of an audio signal represented by the audio data is extended, in such a manner that the extension of the duration at least shortens a gap in the audio signal due to the lost data packet.

In still another embodiment of the invention, there is a communication system for transmitting and/or receiving audio data including samples of an audio signal via a packet-oriented communication network. The system includes, for example, a monitoring unit for detecting an information item relating to the transmission of data packets including audio data, a digital sampling rate conversion device for converting the audio data by altering their sampling rate and a control unit for controlling the sampling rate alteration based on the information item detected.

In yet another embodiment of the invention, there is a communication system for transmitting and/or receiving audio data including samples of an audio signal via a packet-oriented communication network. The system includes, for example, a monitoring unit for detecting an information item relating to the transmission of data packets containing audio data, a digital timescale conversion device for converting the audio data by changing the duration of an audio signal represented by the audio data while retaining a pitch of the audio signal, and a control unit for controlling the change in duration based on the information item detected.

In one aspect of the invention, the digital sampling rate conversion device exhibits a digital filter chip for converting the audio data.

In another aspect of the invention, the digital timescale conversion device exhibits a digital signal processor for converting the audio data.

BRIEF DESCRIPTION OF THE DRAWINGS

In the text which follows, an exemplary embodiment of the invention will be explained in greater detail with reference to the drawing, in which.

DETAILED DESCRIPTION OF THE INVENTION

Figure 1:
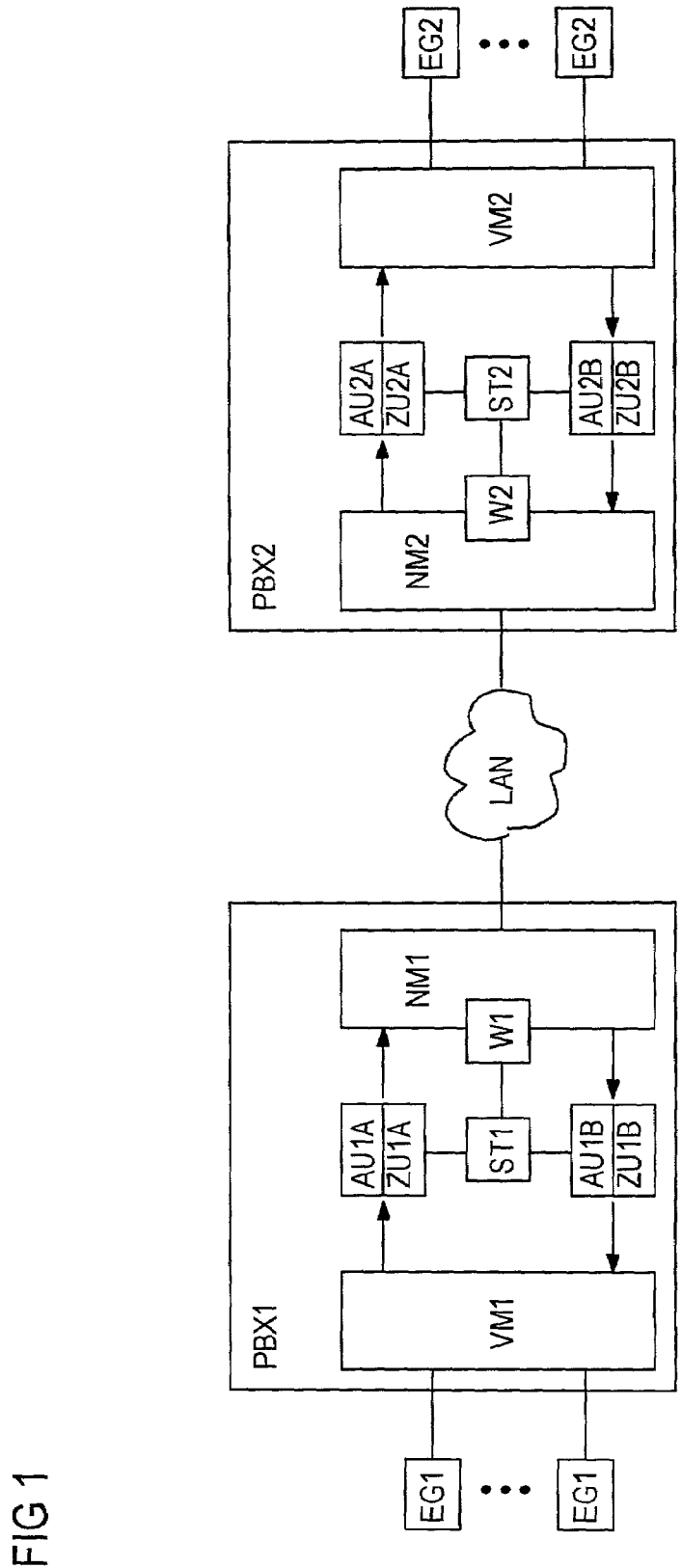
FIG. 1 shows two switching systems for voice transmission, coupled via a local area network, in a diagrammatic representation.

The quality of audio transmissions via any packet-oriented communication networks such as, for example, local area networks (LANs) or wide area networks (WANs) can be improved in a simple manner by means of the invention. The invention can be used advantageously, in particular, in packet-oriented communication networks which do not provide a guaranteed quality of service (QoS). Since it is not necessary to intervene in an existing communication network to be used for transporting the audio data, most of the existing packet-oriented communication networks can be used with the invention.

According to the invention, the quality of an audio transmission is improved by regulating the audio data rate in dependence on the respective transmission situation. The audio data rate is changed by a digital conversion of the audio data. In this arrangement, the audio data is converted in the sense of an alteration of their sampling rate, i.e. the samples of the audio signal produced per unit time, and/or in the sense of a modification of the duration of an audio signal represented by the audio data while largely maintaining its pitch. The first type of conversion mentioned is called "sample rate alteration" (SRA) and can be performed in a simple manner, for example with digital filter chips. The second type of conversion mentioned is called "time scale modification". Various algorithms for performing this conversion are described, for example, in "Time-Scale Modification of Speech Based on Short-Time Fourier Analysis" by M. R. Portnoff, IEEE Transactions on ASSP, July 1981, pages 374 to 390, in "Shape Invariant Time-Scale and Pitch Modification of Speech" by T. F. Quatieri and R. J. McAulay, IEEE Transactions on Signal Processing, March 1992, pages 497 to 510, and in MPEG-4 Audio, ISO/JEC FCD 14496-3 subpart 1, section 4.1, dated May 15, 1998.

The audio data rate can be altered within wide limits and regulated more precisely by the two aforementioned conversion methods than with previous data compression methods normally used in conjunction with packet-oriented audio transmissions. Both conversion methods allow continuous audio data streams to be converted and only delay these to a minimum extent, which results in very good real-time characteristics.

The conversion methods can be implemented both individually or in combination with each other in a given communication system transmitting the audio data and/or in a communication system receiving the audio data. Exemplary communication systems include, for example, audio terminals, audio switching systems such as, for example, so-called private branch exchanges (PBXs) and, in particular, gateways and clients according to ITU-T Recommendation H.323 of the International Telecommunication Union.

According to an advantageous embodiment of the invention, the audio data to be transmitted can be converted by the transmitting communication system and a conversion message relating to the conversion can be transmitted to the receiving communication system. The transmitted conversion message can then be used by the receiving communication system for controlling a reconversion of the audio data. The conversion of the audio data performed at the transmitter end can be largely cancelled again, for example, by a reconversion at the receiver end so that the audio signal represented by the audio data is equalized again.

Transmission of the audio data can also be monitored by the receiving communication system and an information item relating to the transmission can be transmitted to the transmitting communication system. This can then convert the audio data in dependence on the transmitted information item. Thus, for example, the audio data rate, and the data packet rate, can be reduced by a conversion at the transmitter end if the receiving communication system reports an increasing data packet loss rate.

The invention can also be advantageously used for synchronizing communication systems. This can be achieved by converting the received audio data after reading them out of an input buffer provided for equalizing data packet delay variations. In this case, the read-out speed of the input buffer can be controlled by controlling the conversion ratio of the audio data rate as a result of the incorrect synchronization for example, a so-called "delay jitter" can be compensated.

According to an advantageous further development of the invention, packet losses can be compensated by the receiving communication system by extending in time a data packet preceding and/or following a lost data packet by a conversion according to the invention in such a manner that a gap in the audio signal due to the lost data packet is closed or shortened.

Furthermore, the data rate of audio data to be transmitted can be lowered by a conversion in favor of a transmission of additional redundancy information such as, for example, error correction bits and/or CRC check information.

FIG. 1 diagrammatically shows two switching systems PBX1 and PBX2 coupled via a local area network LAN, for example a so-called Ethernet, in each case with connected voice communication terminals EG1 and EG2, respectively. The switching system PBX1 has a switching module VM1 via which the terminals EG1 are connected, and a network module NM1 which is coupled to the local area network LAN. Furthermore, the switching system PBX1 has a sampling rate conversion device AU1A and a timescale conversion device ZU1A for converting audio data to be transmitted from the switching module VM1 to the network module NM1, and a sampling rate conversion device AU1B and a timescale conversion device ZU1B for converting audio data to be transmitted from the network module NM1 to the switching module VM1. The switching system PBX1 also contains a controller ST1 which is coupled to the conversion devices AU1A, ZU1A, AU1B and ZU1B for controlling them, and a monitoring device W1 coupled to the controller ST1 and the network module NM1 for monitoring the data packet transmission via the local area network LAN. To monitor this transmission, the monitoring device W1 can use, for example, the real-time transport protocol RTP and real-time transport control protocol (RTCP), preferably in accordance with ITU-T Recommendation H.225.0 of the International Telecommunication Union.

In the present exemplary embodiment, the switching system PBX2 is of the same design as the switching system PBX1. Its functional components VM2, NM2, ST2, W2, AU2A, ZU2A, AU2B and ZU2B operate in the same way as the correspondingly designated functional components of the switching system PBX1.

The conversion devices AU1A, ZU1A, ..., AU2B and ZU2B are used for the digital conversion of audio data which are given in the form of samples of an audio signal. The sampling rate conversion devices AU1A, AU1B, AU2A and AU2B make it possible to convert audio data in the sense of altering their effective sampling rate. The ratio of altered sampling rate to original sampling rate of the audio signal can be controlled within wide limits.

Figure 2:
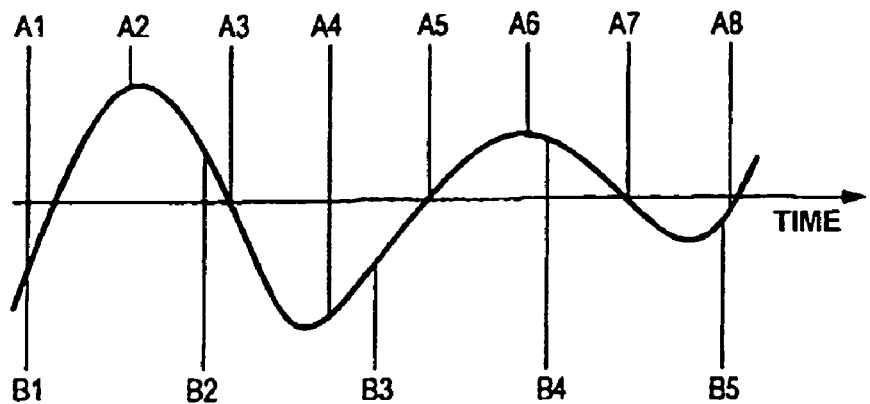
FIG. 2 shows a graphical illustration of the variation with time of an audio signal sampled at different sampling rates.

FIG. 2 illustrates such a sampling rate conversion by means of the signal variation with time of an audio signal. The signal variation of the audio signal is shown by a curve train plotted against a time axis. Before the digital sampling rate conversion, the audio signal is represented by audio data which consist of the samples A1, A2, ..., A8. The samples A1, ..., A8, as indicated by the vertical lines, are given by the instantaneous amplitude values of the audio signal at equidistantly selected points in time. For the conversion to an altered sampling rate, new samples B1, ..., B5 are determined from the samples A1, ..., A8. In the case shown, the samples B1, ..., B5 are to correspond to the instantaneous amplitude values of the audio signal at greater time intervals than the samples A1 to A8. Samples for points in time which are not represented by one of the samples A1 to A8 can be determined, for example, by interpolation of the samples A1, ..., A8 and subsequent low-pass filtering. Such a conversion can be performed, for example, by means of a digital filter.

Using the timescale conversion devices ZU1A, ZU1B, ZU2A and ZU2B, audio data can be converted in such a manner that the duration of the audio signal represented by the audio data changes whilst largely retaining its pitch. The type of a timescale conversion used in the present exemplary embodiment is described, for example, in section 4.1 of the document MPEG-4 Audio, ISO/IEC FCD 14496-3, subpart 1, dated Jun. 15, 1998.

Figure 3:
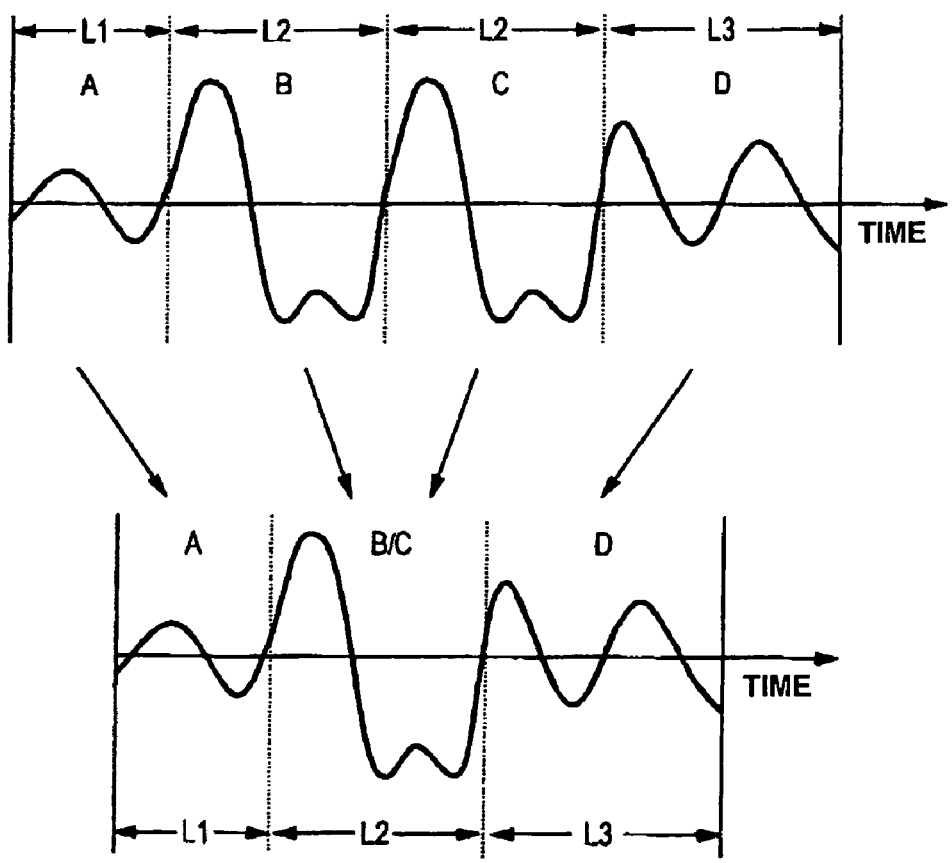
FIG. 3 shows a graphical illustration of a conversion of an audio signal whilst largely retaining its pitch.

FIG. 3 illustrates such a conversion with reference to an audio signal represented by audio data which is shown in each case before and after its conversion. The original audio signal is shown by a curve train plotted against a time axis in the top part of FIG. 3. The audio signal extends over successive time intervals A, B, C and D of respective length L1, L2, L2 and L3, respectively. The audio signal is assumed to be given in each case by a multiplicity of samples, not explicitly shown for the sake of clarity, in each time interval A, B, C, D. To convert the audio signal, two successive time intervals are first determined which exhibit as similar an amplitude variation as possible. In the present case, these are time intervals B and C. The time intervals B and C determined—or, more accurately: the audio data contained therein—are then combined in a single time interval B/C of length L2. This manipulation results in the signal variation shown in the bottom part of FIG. 3 in which time interval A with unaltered signal variation is followed by a single time interval B/C which represents the signal variation of the original audio signal in the original time intervals B and C, and time interval D with an unaltered signal variation. This shortens the duration L1+2*L2+L3 of the original audio signal to the duration L1+L2+L3. To avoid amplitude discontinuities at the interval boundaries between A and B/C and, respectively, between B/C and D, the amplitude variation B/C(t) to be inserted into time interval B/C can be determined as a function of time t from the amplitude variations B(t) and C(t) of the original intervals B and C in accordance with the rule $$B/C(t)=(t*C(t)+(L2-t)*B(t))/L2.$$

The time parameter t is thus always calculated from the respective start of a time interval in quantities B(t), C(t) and B/C(t).

Analogously, the duration of an audio signal can also be extended by inserting one or more additional intervals with an amplitude variation formed in accordance with a similar pattern into the original audio signal. Obviously, when the audio signal is extended or shortened, its frequency spectrum, and thus its pitch, is largely retained. Regardless of the intervals B and C determined by the requirement of extensive similarity of successive curve trains, the factor by which the duration of the audio signal is changed can be largely adjusted continuously by suitably selecting the length of the adjoining intervals A and D.

In real-time operation, a change in the duration of parts of an audio signal corresponds to an effective change of the audio data rate which can thus also be controlled within wide limits by a timescale conversion. Since it is only successive and, as a rule, very short time intervals which are investigated for a similar amplitude variation in the timescale conversion described above, this conversion can take place quasi-continuously with only a very short delay.

A timescale conversion can also be advantageously combined with a sampling rate conversion. In this manner, for example, the pitch of an audio signal can be changed whilst largely retaining the signal duration. Both sampling rate conversion and timescale conversion will only delay an audio data stream to be converted by a very small amount and allows a respective conversion ratio to be varied very quickly. This results in very good real-time characteristics which are found to be very advantageous, especially in the case of real-time voice transmissions.

In the text which follows, a real-time transmission of voice data from a terminal EG1 via the switching system PBX1, the local area network LAN and the switching system PBX2 to a terminal EG2 will be considered without restriction of generality.

The voice data transmitted by the terminal EG1 are received by the switching module VM1 and switched to the network module NM1 via the conversion devices AU1A, ZU1A over a connection which has been set up. The voice data stream to be transmitted is converted in the conversion devices AU1A and ZU1A as illustrated in FIGS. 2 and 3. The sampling rate conversion and/or timescale conversion is controlled by the controller ST1. The conversion ratio, i.e. the ratio between the voice data rate of the original voice data stream and the converted voice data stream is determined in dependence on an information item detected by the monitoring device W1 and relating to the voice transmission. This information item can consist, for example, of a return message, relating to the transmission, from the switching system PBX2 or of messages of the network module NM1 relating to a network state. These messages can relate to, among other things, information on the packet loss rate, the packet delays, any network overload or incorrect synchronization between transmitter and receiver. Such messages are transmitted, for example, by means of the so-called RTP protocol in connection with the so-called RTCP protocol.

The controller ST1 controls the conversion of the voice data in such a manner that a quality of service of the voice transmission is optimized. A quality of service can here relate to, for example, the transmission delay, the packet loss rate, the synchronization between transmitter and receiver and/or the transmission bandwidth. Thus, for example, in the case of return messages which indicate a high packet loss rate, a reduction in the voice data rate can be initiated by the controller ST1 in order to lower the network load. Reduction in the network load, as a rule, causes a reduction in packet loss rate so that the quality of the voice transmission rises. Due to the good real-time characteristics of the conversion devices AU1A and ZU1A, the voice data rate can be very quickly adapted to a new transmission situation detected by the monitoring device W1.

To be able to equalize the distortion of the voice signal caused by the conversion of the voice data again in the switching system PBX2, the controller ST1 also initiates a transmission of a conversion message, describing the conversion, to the switching system PBX2. The conversion message can contain, for example, the respective conversion ratios of a sampling rate conversion and of a timescale conversion.

In the network module NM1, the converted voice data, together with a connection information item identifying the connection between the terminal EG1 and the destination terminal EG2, are divided into individual data packets which are provided with an address information item identifying the switching system PBX2. In the present exemplary embodiment, the voice data are converted into IP data packets in accordance with the so-called Internet protocol (IP) and fed into the local area network LAN. This network then asynchronously transmits the IP data packets to the switching system PBX2 by means of their respective IP address information. A voice transmission by means of IP data packets is frequently also called "voice over IP" (VoIP). Together with the voice data, the respective conversion messages are also transmitted preferably frame-synchronized to the switching system PBX2 via the local area network LAN.

In the network module NM2 of the switching system PBX2, the voice data are extracted again from the received IP data packets and assembled to form a voice data stream. This process is monitored by the monitoring device W2. In particular, transmission parameters such as the packet delays, any packet losses or incorrect synchronization between transmitter and receiver are found by means of the RTP and RTCP protocol. Furthermore, a return message describing the transmission parameters found is formed by means of these real-time protocols and transmitted to the switching system PBX1 via the local area network LAN. At least some of the transmission parameters found are transmitted to the controller ST2 by the monitoring device W2. Furthermore, the monitoring device W2 detects the received conversion message and also transmits it to the controller ST2.

The received voice data are supplied by the network module NM2 to the conversion devices AU2A and ZU2A which convert the voice data under control of the controller ST2 and transmit it to the switching module VM2 which finally switches the voice data to the destination terminal EG2. The conversion of the voice data is controlled by the controller ST2 in dependence on the received conversion message and the transmission parameters found. As a rule, the conversion is controlled by means of the conversion message in such a manner that the alteration of the voice data rate which took place in the switching system PBX1 is largely cancelled again. Due to this equalization at the receiver end, the voice signal again approximates to its original form. If a packet loss is found by the monitoring device W2, the conversion is modified within a short time in such a manner that the duration of the voice signals of a data packet preceding and following the lost data packet is extended in order to close the gap in the voice signal due to the lost data packet. The pitch of the voice signal can be largely retained with such a reconstruction of lost data packets by using the timescale conversion device ZU2A. This method is thus particularly suitable for reconstructing DTMF (dual-tone multifrequency) dial tones in which the pitch has an essential control function.

Controlling the conversion ratio of a conversion also makes it possible to regulate the read-out speed of an input buffer (not shown) and/or synchronization buffer (not shown), provided for equalizing data packet delay variations, of the network module NM2. For this purpose, the respective buffer must be read out via the conversion devices AU2A, ZU2A. During this process, the monitoring device W2 must also detect the respective current fill of the buffer. This fill is transmitted to the controller ST2 which determines the conversion ratio in dependence on this fill. In the case where the converted voice data are read out of the conversion devices AU2A, ZU2A at a constant data rate, any change in the conversion ratio corresponds to a change in the read-out speed of the buffer. Controlling the read-out speed can in many cases prevent a buffer overrun or underrun. Thus, in general, smaller buffers can be provided which reduces the transit delay of the voice data due to the buffer. This, in turn, increases the subjective quality of the voice links.

The above statements apply correspondingly to a transmission of voice data in the reverse direction from a terminal EG2 via the switching system PBX2, the local area network LAN and the switching system PBX1 to a terminal EG1. Instead of the conversion devices AU1A, ZU1A, AU2A and ZU2A, the conversion devices AU2B, ZU2B, AU1B and ZU1B are used for converting the voice data at the transmitting end and receiving end.

The invention claimed is:

1. A method for improving the quality of an audio transmission, comprising:

asynchronously transmitting audio data including samples of an audio signal in data packets from a transmitting communication system via a packet-oriented communication network to a receiving communication system; and detecting an information item relating to the transmission of data packets; and converting the audio data such that their sampling rate is altered by digital filtering, wherein the sampling rate being altered based on the detected information item, in such a manner that due to the altered sampling rate, a quality of service of the audio transmission is optimized with regard to a current transmission situation indicated by the detected information item, the transmission of the data packets is monitored by the receiving communication system and the information item relating to this transmission is transmitted to the transmitting communication system and the audio data are converted by the transmitting communication system based on the information item transmitted, and the received audio data are converted after having been read out of an input buffer provided for compensating data packet delay variations, in which the read-out speed of the input buffer is controlled by a change in an audio data rate due to the conversion.

2. The method as claimed in claim 1, wherein the audio data to be transmitted are converted by the transmitting communication system and a conversion message about the conversion is transmitted from the transmitting communication system to the receiving communication system.

3. The method as claimed in claim 2, wherein the transmitted audio data are reconverted by the receiving communication system, the change in the audio data taking place in the reconversion being determined by means of the conversion message transmitted.

4. The method as claimed in claim 1, wherein the information item transmitted specifies a data packet loss rate and, if the data packet loss rate rises, the audio data are converted by the transmitting communication system in such a manner that the audio data rate is reduced.

5. The method as claimed in claim 1, wherein a detected incorrect adaptation of the data rate of the received audio data is at least partially compensated by the receiving communication system by means of a conversion of the received audio data.

6. The method as claimed in claim 1, wherein in the case of a loss of one of the data packets, the audio data included in the data packet preceding and/or following the lost data packet are converted by the receiving communication system such that the duration of an audio signal represented by the audio data is extended, in such a manner that the extension of the duration at least shortens a gap in the audio signal due to the lost data packet.

7. A method for improving the quality of an audio transmission, comprising:
   asynchronously transmitting audio data including samples of an audio signal in data packets from a transmitting communication system via a packet-oriented communication network to a receiving communication system;
   detecting an information item relating to the transmission of data packets; and
   digitally converting audio data such that the duration of an audio signal represented by the audio data is modified while retaining a pitch of the audio signal, wherein
   the duration being modified based on the detected information item, in such a manner that due to the modified duration, a quality of service of the audio transmission is optimized with regard to a current transmission situation indicated by the detected information item,
   the transmission of the data packets is monitored by the receiving communication system and the information item relating to this transmission is transmitted to the transmitting communication system and the audio data are converted by the transmitting communication system based on the information item transmitted, and
   the received audio data are converted after having been read out of an input buffer provided for compensating data packet delay variations, in which the read-out speed of the input buffer is controlled by a change in an audio data rate due to the conversion.

8. A communication system for transmitting and/or receiving audio data including samples of an audio signal via a packet-oriented communication network, comprising:
   a monitoring unit for detecting an information item relating to the transmission of data packets including audio data;
   a digital sampling rate conversion device for converting the audio data by altering their sampling rate; and
   a control unit for controlling the sampling rate alteration based on the information item detected, wherein
   the transmission of the data packets is monitored by a receiving communication system and the information item relating to the transmission is transmitted to a transmitting communication system and the audio data are converted by the transmitting communication system based on the information item transmitted, and
   the received audio data are converted after having been read out of an input buffer provided for compensating data packet delay variations, in which the read-out speed of the input buffer is controlled by a change in an audio data rate due to the conversion.

9. The communication system as claimed in claim 8, wherein the digital sampling rate conversion device exhibits a digital filter chip for converting the audio data.

10. A communication system for transmitting and/or receiving audio data including samples of an audio signal via a packet-oriented communication network, comprising:
   a monitoring unit for detecting an information item relating to the transmission of data packets containing audio data;
   a digital timescale conversion device for converting the audio data by changing the duration of an audio signal represented by the audio data while retaining a pitch of the audio signal and
   a control unit for controlling the change in duration based on the information item detected, wherein
   the transmission of the data packets is monitored by a receiving communication system and the information item relating to the transmission is transmitted to a transmitting communication system and the audio data are converted by the transmitting communication system based on the information item transmitted, and
   the received audio data are converted after having been read out of an input buffer provided for compensating data packet delay variations, in which the read-out speed of the input buffer is controlled by a change in an audio data rate due to the conversion.

11. The communication system as claimed in claim 10, wherein the digital timescale conversion device exhibits a digital signal processor for converting the audio data.

* * * * *